United States Patent [19]

Schmidt, Jr. et al.

[11] Patent Number: 5,503,418
[45] Date of Patent: Apr. 2, 1996

[54] OFFSET TIE ROD END

[75] Inventors: George R. Schmidt, Jr., St. Louis; Pete Rauch, St. Peters; Timothy J. McDonough, St. Louis, all of Mo.

[73] Assignee: Cooper Industries, Inc., Houston, Tex.

[21] Appl. No.: 303,120

[22] Filed: Sep. 8, 1994

[51] Int. Cl.⁶ .................................................... B62D 7/16
[52] U.S. Cl. ......................... 280/95.1; 280/674; 403/75
[58] Field of Search ................................. 280/95.1, 673, 280/674, 675, 846; 403/75, 76, 77, 90, 91, 122

[56] References Cited

U.S. PATENT DOCUMENTS

| | | | |
|---|---|---|---|
| 2,202,472 | 3/1939 | Tornblom et al. | 403/122 |
| 4,162,859 | 7/1979 | McAfee | 280/95.1 |
| 4,189,249 | 2/1980 | Gaines et al. | 280/95.1 |
| 4,473,240 | 9/1984 | Sanada | 403/122 |
| 4,645,370 | 2/1987 | Kassai | 403/122 |
| 4,875,697 | 10/1989 | Miller | 280/95.1 |
| 4,953,894 | 9/1990 | Broszat et al. | 280/674 |

Primary Examiner—Paul N. Dickson
Attorney, Agent, or Firm—Burns, Doane, Swecker & Mathis

[57] ABSTRACT

An apparatus for moving the pivot point of an automobile steering mechanism. Tie rod connecting link (20) replaces an original equipment tie rod end. Connecting link (20) has a connecting link boss (22). Tie rod socket assembly (30) connects boss (22) with steering knuckle (40). Socket assembly (30) is comprised of stationary stud (36), socket (34), articulating stud (32).

8 Claims, 5 Drawing Sheets

FIG. I
PRIOR ART

OFFSET TIE ROD END

BACKGROUND OF THE INVENTION

This invention relates in general to the location of the pivot point on a steering knuckle mechanism and in particular to altering the pivot point location of the steering arm portion of the knuckle to the tie rod connection, in order to alter a non adjustable steering alignment angle.

The location of the steering arm pivot point in relation to the pivot axis of the front wheel, is a primary detriment in establishing what is known as the Ackerman Angle, and in creating a necessary steering alignment condition known as toe-out in turns. This invention does not intend to quantify the specific requirements of toe-out in turns for a particular vehicle configuration, nor does it intend to teach how the preferred settings at low speed are altered at higher speeds under the influence of varying inside to outside tire slip angles. This tire slip condition is created by centrifugal force acting on the vehicle center of gravity at higher vehicle speeds. The invention simply provides a device which will allow this parameter to be altered from factory specifications in order to accommodate vehicle demands which can vary from one set of operating conditions to another.

In most automobiles the rear wheels travel in a straight forward direction and the forward wheels are turned in order to make the vehicle change direction. It's desirable that all the wheels in a vehicle track about a common turning center in order to minimize tire wear. This turning center (at low speed) is located on a line extending from the rear axle and the intersection of lines drawn through the axis of each front wheel. The inside front wheel must travel around a circle which has a smaller radius than the circle the outside front wheel travels around. Thus, the inside wheel should have a greater turn angle than the outside wheel. These angles are established to a large extent by location of the pivot point for the steering arm in relation to the steering axis for the wheel. Each steering arm rotates through its own arc of travel. It rotates on its axis when the front wheels are turned. The angle of these arms in relation to the wheel steering axis causes one wheel to turn more sharply than the other.

If the angle of the outside wheel is too great in relation to the inside wheel in a turn the front tires will scrub along the outer edge causing excessive tire wear. This problem may be corrected by altering the location of the pivot point of the steering mechanism. However, this pivot point is established during design of a particular vehicle and is not adjustable after the automobile has been manufactured.

One means for moving the steering arm pivot point on existing vehicles is to relocate the appropriate pivot points on the steering knuckle. Steering knuckles, however, are usually good for the life of the vehicle and are not normally replaced. Also steering knuckles are expensive parts and this would not be an economic solution.

SUMMARY OF THE PRESENT INVENTION

The present invention provides a means of altering the steering pivot point on the knuckle by replacing a conventional outer tie rod end, with a tie rod connecting link having a tie rod socket assembly including an articulating stud and a stationary stud. The articulating stud moves the steering pivot point without altering the vertical height of the pivot point in relation to the ball joint attaching points. This pivot point may be moved outboard or inboard based upon steering arm position, and desired change in turning geometry.

DETAILED DESCRIPTION OF THE PRESENT INVENTION

Figure 1:
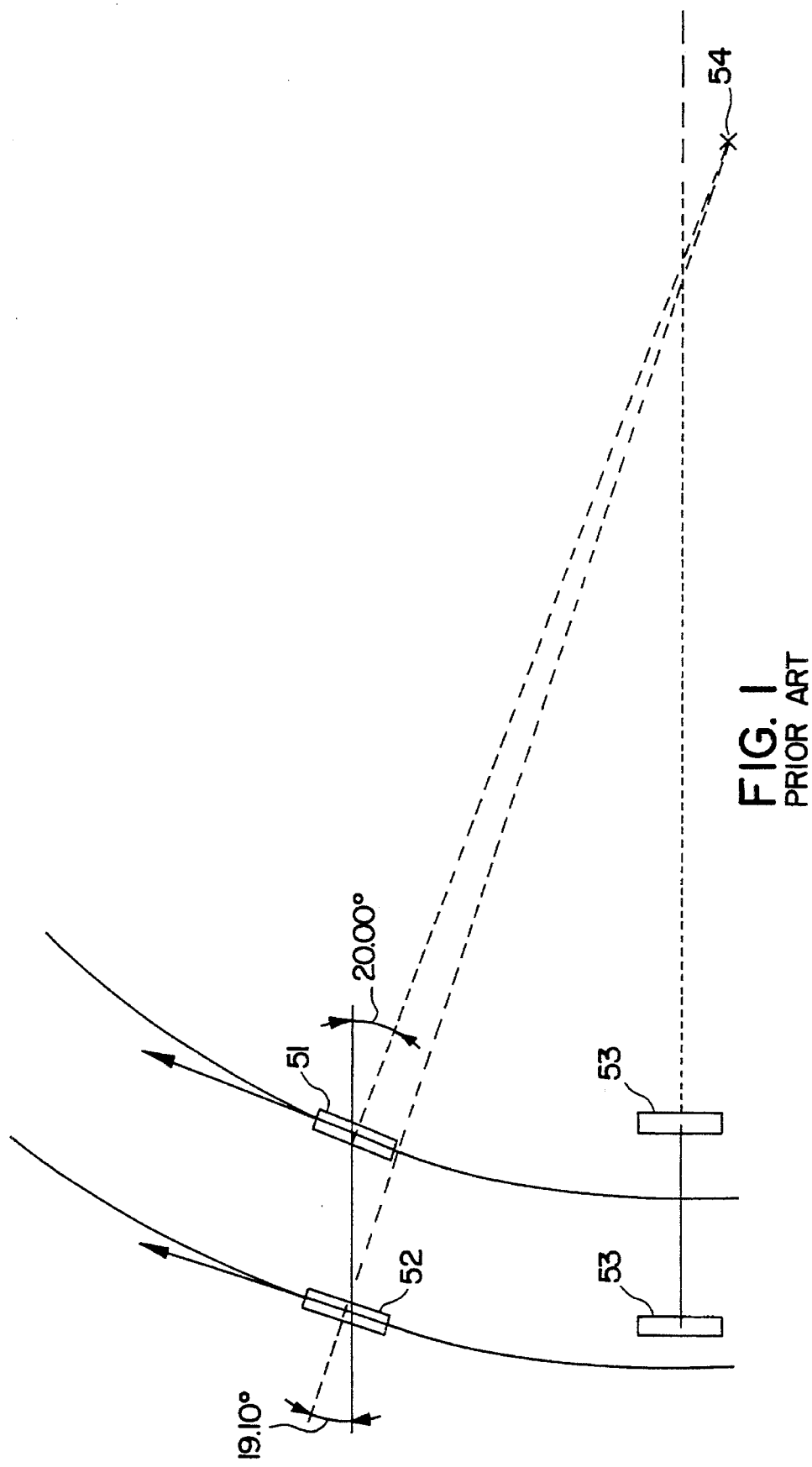
FIG. 1 shows a plan view of an automobile track with a pivot point providing for too large an angle for the outer wheel (insufficient toe out in turns).

FIG. 1 shows a plan of steering geometry for an automobile having a pivot point which is incorrectly located. Point 54 is located below a line through the axis of the rear wheels 53. If the outside front wheel 52 has too great an angle compared to the turn angle of the inside front wheel 51, steering geometry as shown in FIG. 1 will cause a radius formed from the outside wheel 52 to intersect the line formed by the inside front wheels at a point 54 forcing wheel scuffing in a turn causing excessive tire wear along the outer edges.

Figure 2:
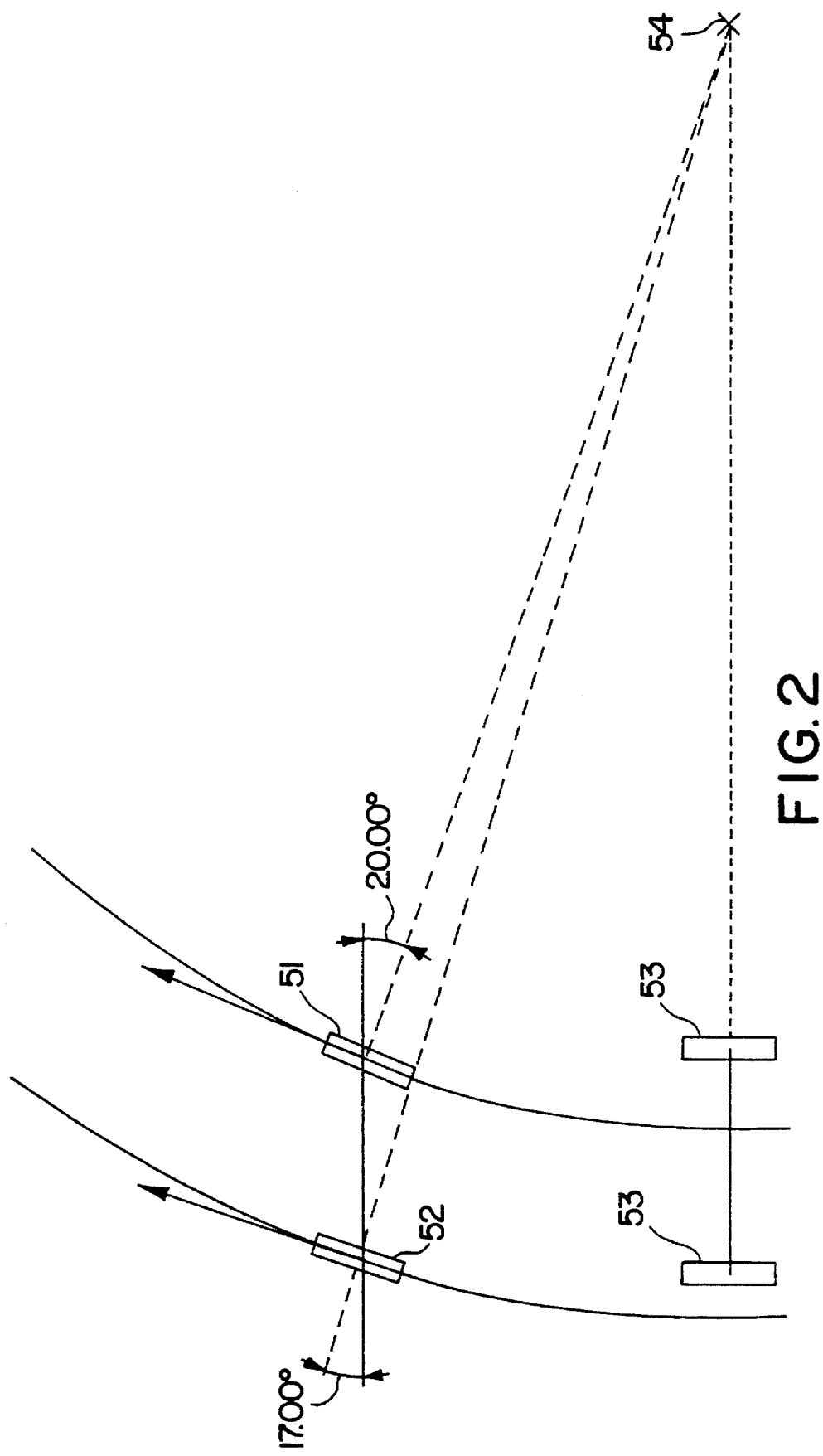
FIG. 2 shows a plan view with the pivot point of the steering mechanism altered according to the present invention.

A more desirable turning geometry particularly at low speeds where tire slip angles are not appreciable is shown in FIG. 2. The turning angle of outside front wheel 52 has been decreased in this example to 17 degrees compared to 20 degrees for the inside front wheel. This allows the outside front wheel to point in a direction tangent to the radius of a circle formed by a radius through point 54.

Figure 3:
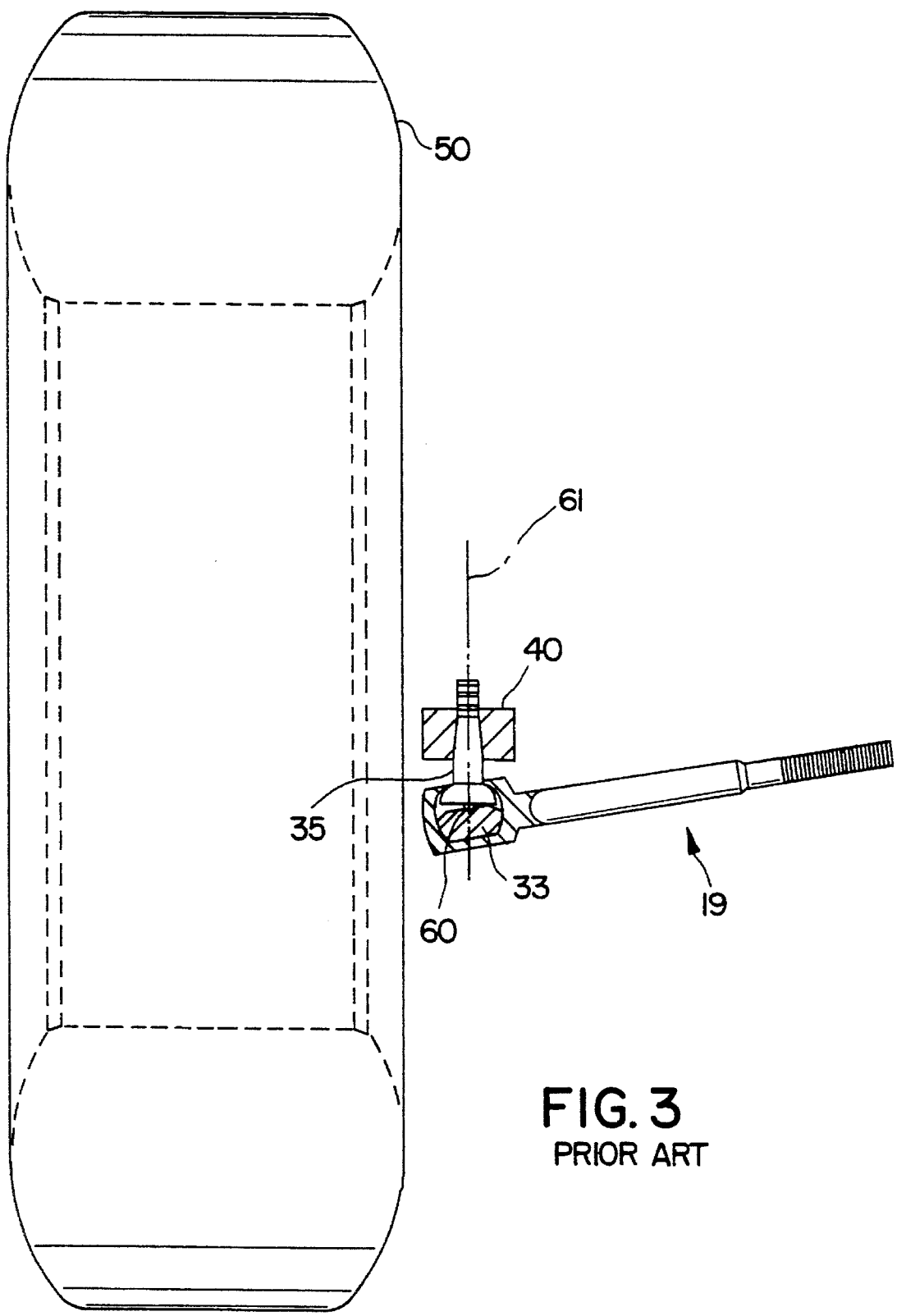
FIG. 3 shows a schematic view of an outer tie rod according to the prior art.

FIG. 3 shows a schematic view of an outer tie rod end 19 that is presently available. Outer tie rod end 19 has a socket 33 and stud 35. The stud 35 is connected to steering arm 40. Socket 33 contains pivot point 60 which is located directly in line with the center line 61 of stud 35.

Figure 4:
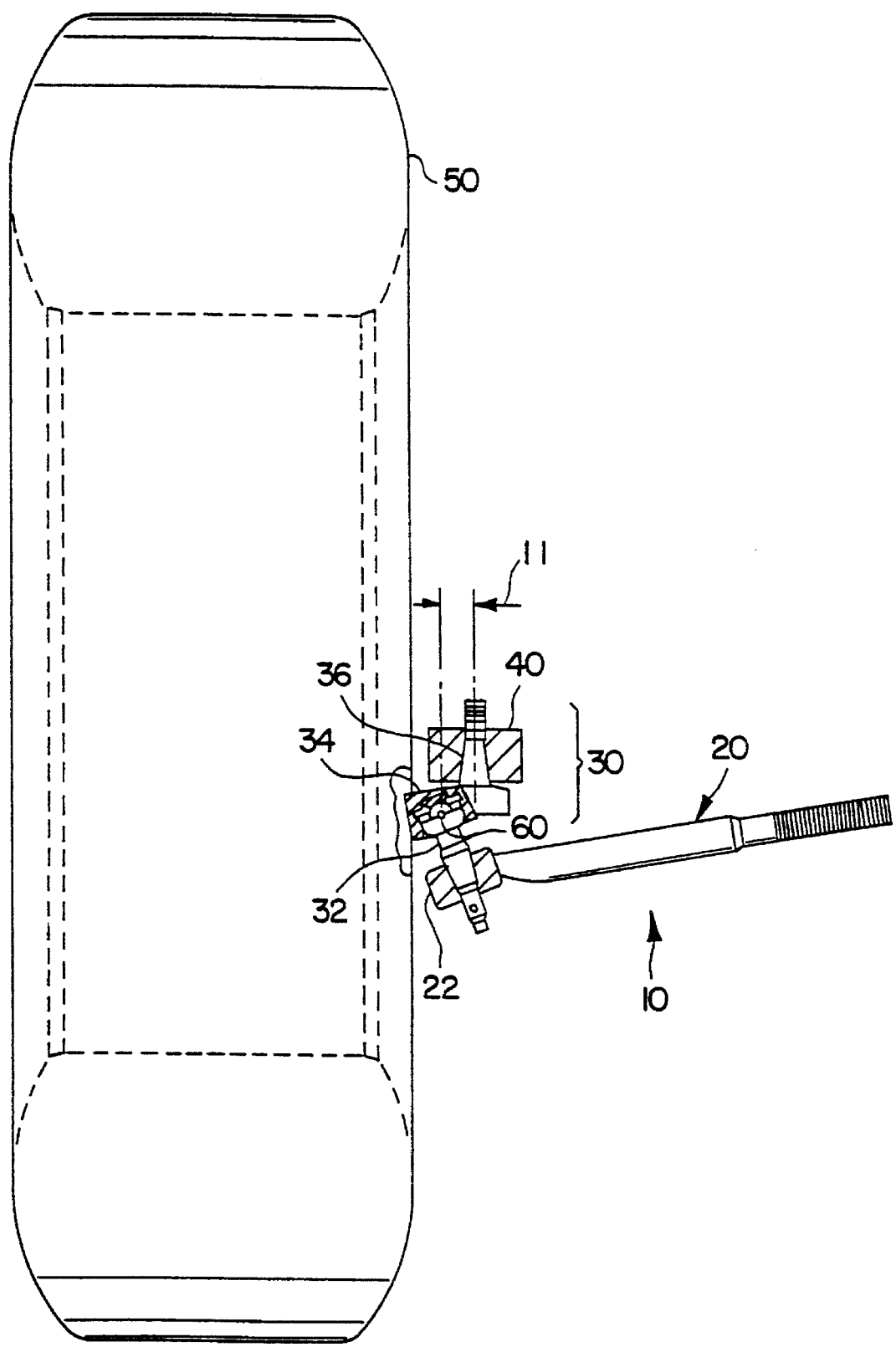
FIG. 4 shows a schematic view of a tie rod according to the present invention.

FIG. 4 shows a tie rod end 10 according to the present invention. In this embodiment, tie rod connecting link 20 ends in a connecting link boss 22. Tie rod socket assembly 30 is comprised of stationary stud 36, offset socket 34, and articulating stud 32. Articulating stud 32 is attached to tie rod connecting link 20 by means of connecting link boss 22. Socket assembly 30 is also attached to steering arm 40 by stationary stud 36. Thus, pivot point 60 has been moved to the left or in an outward direction by an offset as shown by distance 11. This has been accomplished without a vertical change of the height of the pivot point relative to steering arm 40, which would create additional problems.

Figure 5:
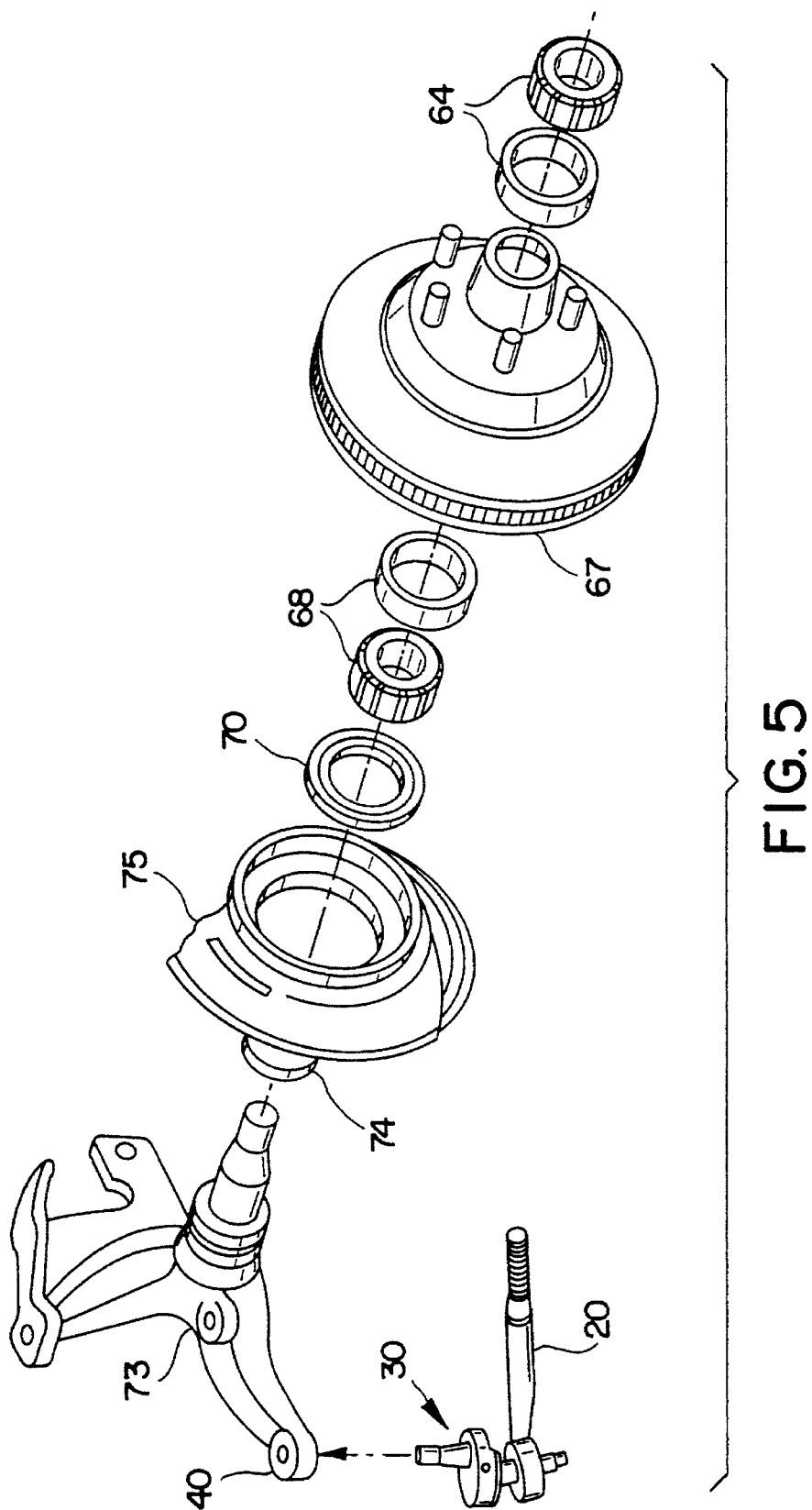
FIG. 5 shows a perspective view, partially disassembled, of a tie rod connecting link and a tie rod socket assembly according to the present invention.

FIG. 5 shows a perspective view partially disassembled of socket assembly 30 and tie rod connecting link 20 as they would be attached to a knuckle assembly 73. Knuckle assembly 73 is connected through gasket 74 and shield 75 through seal 70 and inner bearings 68, rotor 67, and outer bearing 64 which connects to the wheel and tire assembly 100, not shown.

The invention as shown and described presents an embodiment wherein the pivot point has been moved in an outward direction on a pre-existing car to correct a steering problem. In other automobiles the pivot point may have to be moved in an inward direction to compensate for other steering geometry and/or problems. For example, the steering arm may be located forward or rearward of the center line of the wheel in some automobiles.

We claim:

1. A means for altering the tie rod pivot point on a vehicle steering knuckle comprising:

a tie rod connecting link;

a tie rod socket assembly connected to said tie rod connecting link;

a steering knuckle attached to a wheel and connected to said tie rod socket assembly; and said tie rod socket assembly including a stationary stud connected to said steering knuckle, an offset socket attached to said stationary stud, and an articulating stud, the articulating stud including a ball and a stud, the bail being pivotally disposed in the offset socket and the stud being connected to the tie rod connecting link, wherein said tie rod socket assembly provides a pivot point for a steering mechanism, offset from all original attachment point of a steering arm portion of said steering knuckle.

2. A means as in claim 1 wherein said pivot point is moved outward of an original pivot point.

3. A means as in claim 2 wherein said pivot point is disposed at a vertical distance from said steering arm portion, the vertical distance being substantially equal to a vertical distance of said original pivot point from said steering arm portion.

4. A means as in claim 1 wherein said pivot point is moved inward of said original attachment point.

5. A method for altering an outer tie rod pivot point on a vehicle steering knuckle by replacing an original tie rod socket assembly on an outer tie rod end comprising the steps of:

attaching an offset tie rod socket assembly to a tie rod connecting link, the offset tie rod socket assembly including a stationary stud, an offset socket attached to said stationary stud, the offset socket including a socket having a center point offset from a centerline of said stationary stud, and an articulating stud, said articulating stud including a ball pivotally disposed in the socket and a stud attached to said tie rod connecting link; and attaching said stationary stud of said offset socket assembly to a steering knuckle attached to a wheel wherein said offset tie rod socket assembly provides a pivot point, at the center point of the socket, for a steering mechanism, offset from an original pivot point.

6. A method as in claim 5 wherein said pivot point is moved outward of the original pivot point.

7. A method as in claim 5 wherein said pivot point is moved inward of the original pivot point.

8. A method as in claim 5, comprising the further step of turning the offset socket assembly so that the center point of the socket is at a desired position around a centerline of said fixed stud.

* * * * *